Sept. 2, 1969 R. J. KOERNER 3,465,303

CONTENT ADDRESSABLE MEMORY EMPLOYING SEQUENTIAL CONTROL

Filed June 20, 1966 3 Sheets-Sheet 1

INVENTOR.
RALPH J. KOERNER
BY Arthur Freilich
ATTORNEY

INVENTOR.
RALPH J. KOERNER
BY Arthur Freilich
ATTORNEY

INVENTOR.
RALPH J. KOERNER
BY Arthur Frelich
ATTORNEY 3,465,303
Patented Sept. 2, 1969

3,465,303

CONTENT ADDRESSABLE MEMORY EMPLOYING SEQUENTIAL CONTROL

Ralph J. Koerner, Canoga Park, Calif., assignor to The Bunker-Ramo Corporation, Stamford, Conn., a corporation of Delaware Filed June 20, 1966, Ser. No. 558,651
Int. Cl. G11c 7/00
U.S. Cl. 340—173 15 Claims

ABSTRACT OF THE DISCLOSURE

A parallel by word, serial by bit content addressable memory system for comparing a search word with stored data words. The system provides for both search and control words to be stored in rows of the system memory so that the bits thereof can be sequentially accessed, as needed, by essentially the same sequencing hardware that is required for comparison of the stored data word and search word bits.

This invention relates generally to digital memories and more particularly to improvements in content addressable memories.

U.S. Patent No. 3,031,650 discloses some basic content addressable memory implementations and discusses the characteristics which distinguish such memories from conventional digital memories. Briefly, the significant distinguishing characteristic is that each word location in a content addressable memory is not uniquely identified by an address as in conventional digital memories but instead content addressable memory locations are selected on the basis of information stored therein; i.e. the contents thereof. Hence, the name content addressable memory.

As a result of selecting locations on the basis of stored information, memory search times can be considerably reduced at the cost of some additional hardware. That is, in situations where it is desired to select those locations, out of N locations in memory, stored data words matching a search word, information identifying those locations can be derived in one memory access period instead of the N such periods required by conventional digital memories. More particularly, whereas it is necessary in a conventional digital memory to sequentially access the contents of each location and compare each accessed data word with a search word, comparison of the search word with all of the data words can be simultaneously effected in a content addressable memory.

Essentially, most content addressable memory systems operate by causing one or more signals representative of a search word bit to be applied simultaneously to all memory elements storing bits of corresponding significance. Some type of logic means is provided in the memory, such means being operable to generate signals to indicate whether the bits stored in the various memory elements are the same as or different from the corresponding search bit being sought. All elements of a single memory word location are coupled to a comman word line and by sensing resultant signals appearing on the word line, a determination is made as to whether or not the data word stored in the memory location associated with the word line matches or mismatches the search word.

Whereas the content addressable memory embodiment discloses in the aforementioned U.S. Patent No. 3,031,650 performs a search which considers all stored bits in parallel, as well as all stored words, U.S. Patent No. 3,297,995 by Ralph J. Koerner and Alfred D. Scarbrough and assigned to the same assignee as the present application, discloses a content addressable memory embodiment which causes the bits of stored data words to be considered serially or sequentially, while the words are still considered in a parallel fashion.

Briefly, the present invention is based on the recognition that inasmuch as sequential content addressable memory systems utilize the bits of the search word and various control words in sequence, the bits of these words can be sequentially accessed from an appropriate digital memory as they are needed.

More particularly, whereas it has been common practice to provide registers external to the content addressable memory matrix for storing the search word and various control words, preferred embodiments of the present invention provide for these words to be stored in the content addressable memory matrix so that the bits thereof can be sequentially accessed by essentially the same sequencing hardware required for comparison of the stored data word and search word bits.

Thus, consider a content addressable memory system in which binary interrogation signals are coupled in sequence to the columns of a content addressable memory matrix, each binary interrogation signal representing the state of a search word bit (accessed during a previous time period). As a consequence of the application of an interrogation signal to a matrix column, mismatch signals will appear on those word lines coupled to memory elements of the interrogated column whose states do not match the represented search word bit. In addition to interrogating the elements storing the data word bits, each interrogation signal will also cause the next search word bit to be read for use during the next time period.

In one embodiment of the invention disclosed herein, the two states of a binary interrogation signal are respectively manifested by a change in current level in first and second directions. That is, the current on each digit line is either increased or decreased from a quiescent direct current level. In another disclosed embodiment of the present invention, the two states of a binary interrogation signal are manifested by the relative occurrence in time of a gating signal. In addition to the two different techniques disclosed herein for comparing a search word bit and a data word bit, it is recognized that many other techniques are known in the art which also can be used in conjunction with the concept of the present invention. For example only, cancellation techniques as disclosed in U.S. Patent No. 3,292,159 by Ralph J. Koerner and assigned to the same assignee as the present invention can also be advantageously employed with the teachings of the present invention.

In addition to storing the search word in the content addressable memory matrix, various control words can also be stored therein such that the bits thereof can be read out in sequence as they are needed. Thus, a "search word mask" control word can be used to exclude certain search word bits from being considered in the course of a search. An "inhibit" control word can be used to establish a magnitude criterion and a field marker word can be employed for the purpose either of changing criteria or of masking data word fields.

The novel features that are considered characteristic of this invention are set forth with particularity in the appended claims. The invention will best be understood from the following description when read in connection with the accompanying drawings, in which:

Figure 1:
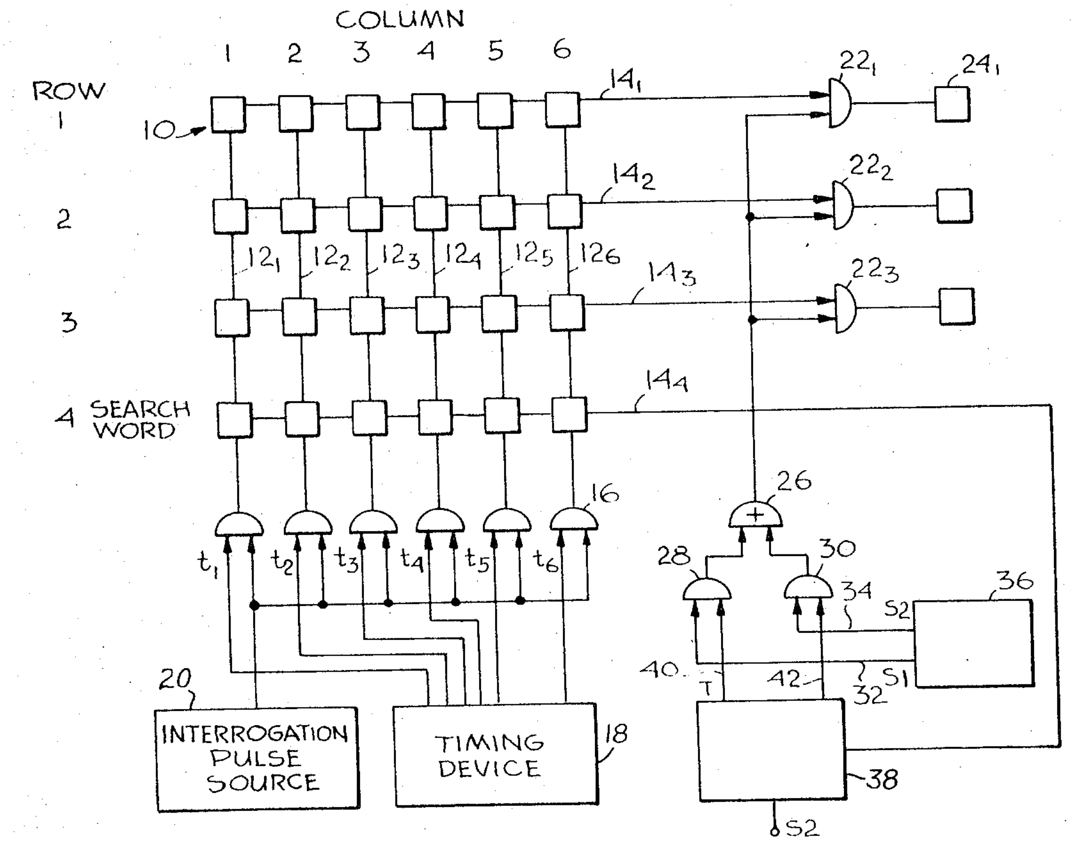
FIGURE 1 is a block diagram of a content addressable memory system in accordance with the present invention.

Attention is now called to FIGURE 1 which illustrates a block diagram of a content addressable memory system in accordance with the present invention. From what has been said thus far, it should be appreciated that content addressable memory systems are useful for enabling a multibit search word to be simultaneously compared with a plurality of multibit stored words in accordance with some defined criterion. Thus, as is explained in detail in the aforecited Patent No. 3,297,995, an "exact match" criterion can be defined, for example, or magnitude criteria such as "equal to or greater than" can be specified. In accordance with the present invention, the bits of the search word are accessed as they are needed for comparison with the corresponding bits of the stored data words. Similarly, the bits of various control words used to define search criteria for example are also sequentially accessed as they are needed.

More particularly, consider the embodiment of FIGURE 1 which includes a matrix of memory elements 10 arranged in rows and columns. Although it will be appreciated that any size matrix can be employed in accordance with the teachings of the invention, it will be noted that the exemplary matrix of FIGURE 1 includes four rows and six columns. Each row of elements defines a word location and thus the matrix illustrated in FIGURE 1 is capable of storing four six-bit words.

All of the elements of a single column are coupled to a common digit line 12. Thus, the elements of column 1 are all coupled to digit line $12_1$ and similarly the elements of columns 2 through 6 are respectively coupled to digit lines $12_2$ through $12_6$. All of the elements 10 of a single row are coupled to a common word line 14. Thus, the elements of row 1 are coupled to word line $14_1$ and the elements of rows 2, 3, and 4 are respectively coupled to word lines $14_2$–$14_4$.

Each of the digit lines 12 is connected to the output of a different AND gate 16. Each of the AND gates 16 has an input thereof connected to a different output terminal of a timing device 18. The timing device 18 sequentially defines time slots $t_1$ through $t_7$ and in each time slot enables a different one of the gates 16. A second input to each of the gates 16 is derived from the output of an interrogate pulse source 20. Thus, during each of the time slots, an interrogate pulse is applied to one of the digit lines 12.

Let it be assumed that multibit data words are stored in each of rows 1, 2, and 3 of the matrix shown in FIGURE 1 and further let it be assumed that a multibit search word is stored in row 4. Each of the word lines $14_1$, $14_2$, and $14_3$ coupled to elements storing the data words is connected to the input of an AND gate 22. Thus, for example, word line $14_1$ is connected to the input of AND gate $22_1$. The output of each AND gate 22 is connected to a binary sense element 24 capable of defining a match and a mismatch state.

A second input to each of the AND gates 22 is derived from the output of an OR gate 26 whose inputs are derived from AND gates 28 and 30. AND gates 28 and 30 are utilized to respectively pass strobe pulses, S1 and S2, provided on output terminals 32, 34 of a multivibrator 36. That is, when AND gate 28 is enabled, strobe pulse S1 will be passed through gates 28 and 26 to the gates 22. On the other hand, when gate 28 is disabled and gate 30 is enabled, strobe pulse S2 will be passed through gates 30 and 26 to the gates 22. A flip-flop 38 determines which of gates 28 and 30 will be enabled.

More particularly, the flip-flop 38 is provided with a true output terminal 40 which is connected to the input of AND gate 28 and a false output terminal 42 connected to the input of gate 30. Thus, when the flip-flop 38 defines a true state, gate 28 will be enabled to pass strobing pulse S1 and when the flip-flop 38 defines a false state, gate 30 will be enabled to pass the strobing pulse S2. The flip-flop 38 is controlled by the word line $14_4$ on which signals will successively appear representing the search word bits. More particulraly, the flip-flop 38 is gated so as to be able to change state only coincident with the strobe pulse S2. For reasons which will be better understood hereinafter, if a positive pulse appears on word line $14_4$ coincident with strobe pulse S2, the flip-flop 38 switch to a "1" or true state and if a negative pulse is coincident with pulse S2, then the flip-flop will switch to a "0" or false state.

Figure 2:
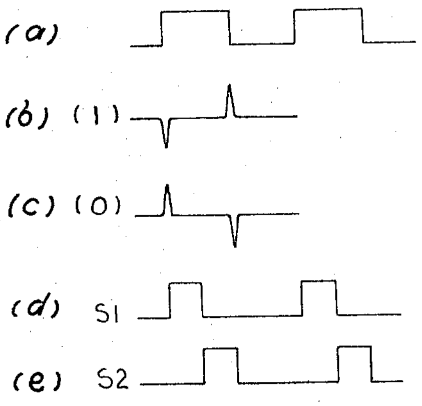
FIGURE 2 is a waveform diagram provided in order to facilitate an explanation of the operation of the embodiment of FIGURE 1.

In order to better understand the operation of the embodiment of FIGURE 1, attention is called to the waveform chart of FIGURE 2. Line (*a*) of FIGURE 2 illustrates a train of essentially square wave interrogate pulses which are applied to the digit lines 12 in sequence. Let it be assumed that the bit storage elements 10 are of the magnetic domain rotation type such as thin film elements or multiaperture magnetic core elements (e.g. a Biax). These elements exhibit output characteristics as shown in lines (*b*) and (*c*) of FIGURE 2 in response to an interrogate pulse as shown in line (*a*). More particularly, in response to the leading edge of an interrogate pulse applied to a digit line, each element 10 coupled to that digit line will provide a pulse on the word line coupled thereto whose polarity is dependent upon the state of the stored bit. Thus, if the element stores a "1," then substantially coincident with the leading edge of the interrogate pulse, a negative pulse will be provided on the word line. On the other hand, if the element stores a "0," then it will provide a positive pulse on the word line coupled thereto substantially coincident with the leading edge of the interrogate pulse. On the other hand, substantially coincident with the trailing edge of the interrogate pulse, the element will provide a positive pulse on the word line coupled thereto, if it stores a "1" and a negative pulse if it stores a "0." It will of course be appreciated that reference to the "1" and "0" states is arbitrary and is used merely to distinguish between two different states of magnetic remanence.

In accordance with the present invention, it is preferable to store the bits of the search word such that each bit precedes by one column the bits of corresponding significance in the data words. More particularly, the first bit of the search word, corresponding to the data word bits stored in matrix column 1, is preset into flip-flop 38 prior to time slot $t_1$. The second search word bit which corresponds to the data word bits stored in matrix column 2 is stored in the column 1 memory element of row 4 which stores the search word. Similarly, all of the other search word bits are shifted left one column as compared to the data word bits of corresponding significance.

Assume as an example that the flip-flop 38 initially stores a "1" bit and it is desired to compare this bit with the data word bits stored in column 1 of the matrix. During time slot $t_1$, digit line $12_1$ will be pulsed to thereby generate a bipolar output signal on each of the word lines. For example, if a "1" is stored in the element of column 1 and row 1, then the signal shown in line (*b*) of FIGURE 2 will appear on word line $14_1$. On the other hand, if a "0" had been stored, then the signal shown in line (*c*) of FIGURE 2 will appear. Since the flip-flop 38 stores a "1," then the gate 28 will be enabled to pass the strobe pulse S1 [shown in line (*d*), FIGURE 2] to the gates 22. If a "0" output signal appears on a word line, then the gate 22 will pass a positive pulse to the sense element 24 connected thereto. On the other hand, if a "1" output pulse appears on a word line, then a positive pulse will not be coupled to the sense element 24. It can be assumed that each sense element 24 initially defines a match state and can be switched to a mismatch state only in response to a positive pulse being applied thereto. Accordingly, it should now be apparent that if the flip-flop 38 initially defines a "1" then after time slot $t_1$, all of those sense elements 24 associated with rows in which the column 1 element thereof stored a "0," will have switched to a mismatch state. Those elements 24 associated with rows in which the column 1 element thereof stored a "1," will remain in a match state. The interrogate pulse applied to the digit line $\mathbf{12}_1$ will of course also interrogate the element in column 1 of row 4 storing the next search word bit. Thus, during time slot $t_1$, an output signal will appear on word line $\mathbf{14}_4$ which represents the state of the next search word bit to be compared with the data word bits stored in matrix column 2.

As previously noted, the output signal on line $\mathbf{14}_4$ is used to control the flip-flop 38. Thus, if a positive pulse appears on line $\mathbf{14}_4$ coincident with strobe pulse S2, the flip-flop is switched to a "1" state and if a negative pulse appears the flip-flop is switched to a "0" state. Accordingly, it should now be appreciated that by sequentially applying interrogation pulses to the digit lines $\mathbf{12}_1$ through $\mathbf{12}_6$, search word bits will be sequentially read out from row 4 of the matrix and stored in flip-flop 38 for comparison with the stored data word bits during the subsequent time slot.

Figure 3:
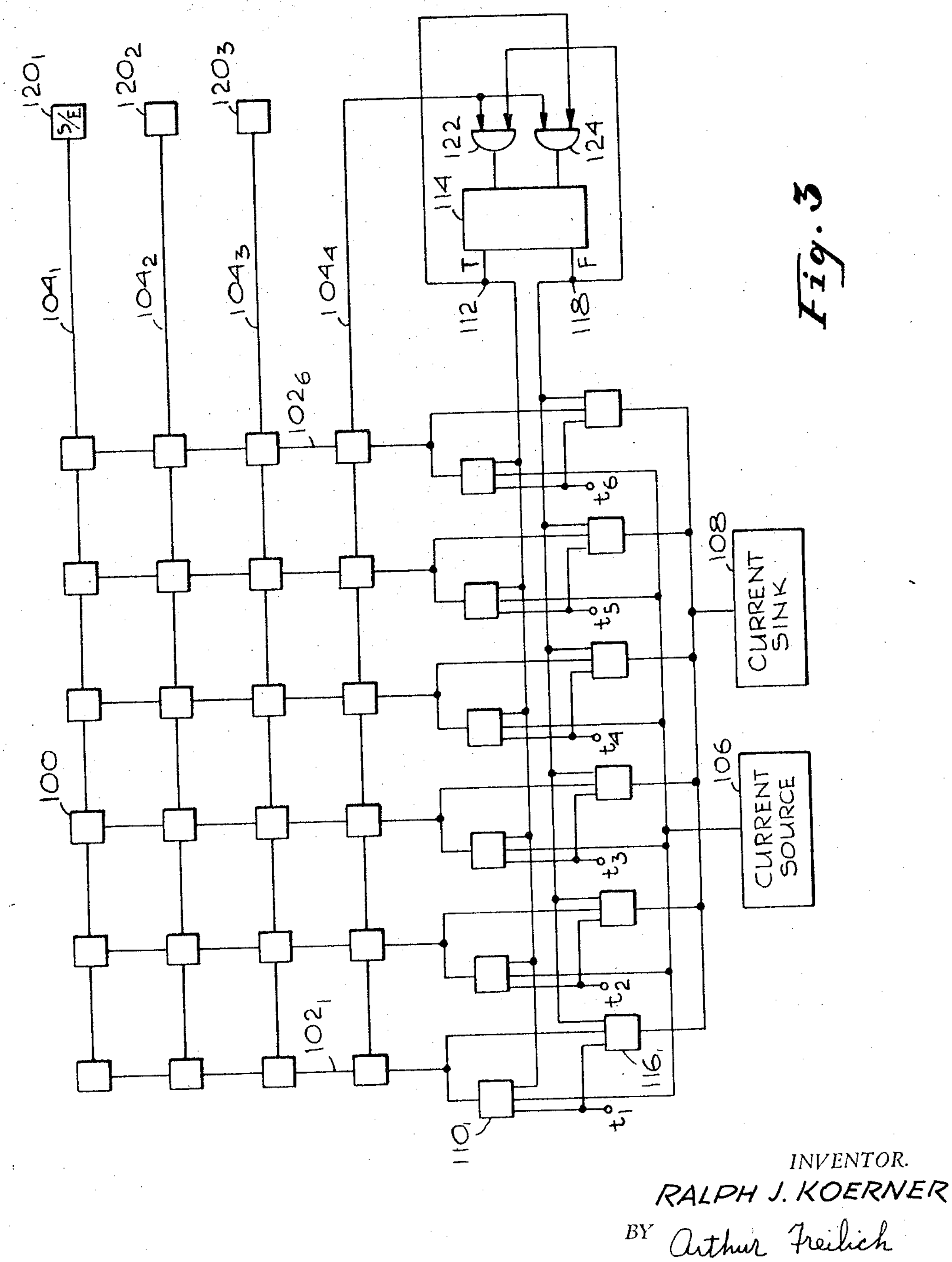
FIGURE 3 is a block diagram of an alternative embodiment of the invention.

Although the embodiment of the invention disclosed in FIGURES 1 and 2 can very rapidly compare a search word with a plurality of stored words, a significantly faster approach for accomplishing this same purpose is illustrated in the embodiment of FIGURE 3. More particularly, the previously cited U.S. Patent No. 3,297,995 discloses a system in which comparison between a search word bit and a stored word bit is effected by utilizing a change in current level on a digit line in either a first or second direction dependent upon the state of the search word bit. That is, rather than utilize a full interrogate pulse with a leading and trailing edge as shown in FIGURE 2(*a*), the cited patent application teaches that the memory elements will provide a single output pulse when interrogated by a single change in current level. As a consequence, the matrix columns can be interrogated much more rapidly than is possible in a system of the type shown in FIGURE 1. The embodiment illustrated in FIGURE 3 employs the concept of changing the current level on each digit line in only one direction in order to more rapidly execute a search.

Attention is now called to the embodiment of FIGURE 3 which, it will be noted, is structurally similar to the embodiment of FIGURE 1. More particularly, the embodiment of FIGURE 3 is comprised of a matrix of memory elements identical to the matrix illustrated in FIGURE 1. Thus, a plurality of memory elements 100 are arranged in rows and columns. As in the embodiment of FIGURE 1, six columns and four rows are illustrated although it should be appreciated that the invention is not at all dependent upon the size of the matrix employed. All of the elements 100 in the same column are coupled to a common digit line 102. Thus the elements of columns 1 through 6 are respectively coupled to digit lines $\mathbf{102}_1$–$\mathbf{102}_6$. All of the elements 100 in a single row are coupled to a common word line. Thus, the elements of rows 1–4 of the matrix are respectively coupled to word lines $\mathbf{104}_1$–$\mathbf{104}_4$.

Figure 4:
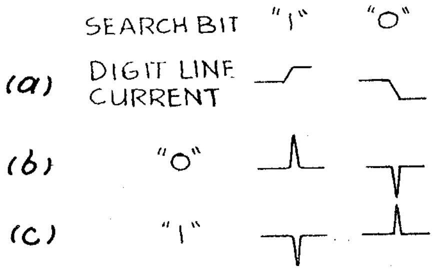
FIGURE 4 is a waveform diagram illustrated in order to facilitate an explanation of the operation of the embodiment of FIGURE 3.

As previously pointed out, the elements 100 in the embodiment of FIGURE 3 are interrogated by either increasing or decreasing the current level on a digit line depending upon the search bit being compared. More particularly, as is shown in FIGURE 4, if the current on a digit line is increased from a quiescent level, then an element storing a "0" will provide a positive pulse on the word line coupled thereto while an element storing a "1" will provide a negative pulse. On the other hand, if the current level on the digit line is decreased, then elements storing a "0" will generate a negative pulse on the word line and elements storing a "1" will generate a positive pulse. It should be appreciated that the characteristics of the memory elements represented by the waveshapes of FIGURE 4 are identical to the characteristics illustrated in FIGURE 2. The difference between the waveshapes of FIGURES 2 and 4 of course resides in the fact that the memory elements of FIGURE 1 are interrogated by a complete interrogation pulse as shown in line (*a*) of FIGURE 2 while the elements 100 of FIGURE 3 are interrogated by changing the current level on a digit line in either a first or second direction. It should be apparent from FIGURE 4 that in order to develop positive pulses on the word lines to represent a mismatch, it is necessary to utilize an increase in digit current level if the search bit is a "1" and a decrease in the digit line current level if the search bit is a "0."

Returning now to a consideration of FIGURE 3, it will be noted that a current source 106 and a current sink 108 are provided for respectively increasing and decreasing the current level on the digit lines. More particularly, the current source 106 is connected to the input of a plurality of gates 110. The output of each gate 110 is connected to a different one of the digit lines. Thus, gate $\mathbf{110}_1$ is connected to digit line $\mathbf{102}_1$. A second input to each of the gates 110 is derived from the true output terminal 112 of a search bit flip-flop 114. Inasmuch as a different one of gates 110 is to be enabled during each time slot, the output terminals of a timing device (not shown in FIGURE 3) are respectively connected to the inputs of the gates 110. Thus, if the flip-flop 114 defines a true state, then during time slot $t_1$, the gate $\mathbf{110}_1$ will couple the current source 106 to the digit line $\mathbf{102}_1$ to increase the current level therein.

In order to enable the current level in the digit lines to be decreased, each digit line is connetced to the input of a different gate 116. Thus, digit line $\mathbf{102}_1$ is connected to the input of gate $\mathbf{116}_1$. The false output terminal 118 of flip-flop 114 is connected to the input of all of the gates 116. In addition, the timing device terminals are also connected to the inputs of the gates 116 so that the gate $\mathbf{116}_1$, for example, will be enabled during time slot $t_1$. In order to understand the operation of the embodiment of FIGURE 3, consider that the search word bits are shifted relative to the stored data word bits in the same manner as was discussed with respect to the embodiment of FIGURE 1. That is, each search word bit is shifted one column to the left of the data word bits of corresponding significance. The initial search word bit corresponding to the data word bit stored in column 1 of the matrix is preset into the flip-flop 114. Assume that the initial search word bit is a "1." As a consequence, during time slot $t_1$, gate $\mathbf{110}_1$ will be enabled to thereby couple the current source 106 to the digit line $\mathbf{102}_1$ to increase the current level therein. As a consequence, positive pulses (as demonstrated by FIGURE 4) will be developed on those word lines 104 associated with column 1 memory elements storing a "0." A positive pulse appearing on a word line 104 will of course switch the sense element 120 coupled thereto from a match to mismatch state. Thus, at the end of time slot $t_1$, the sense elements 120 will indicate those words whose initial bit mismatched the initial search word bit.

The change in current level on the digit line $\mathbf{102}_1$ will also of course affect the bit stored in column 1 of matrix row 4. It should of course be appreciated that this bit comprises the second search word bit. As a consequence of the current level change in digit line $\mathbf{102}_1$, either a positive or a negative pulse will appear on word line $\mathbf{104}_4$. The appearance of a positive pulse on word line $\mathbf{104}_4$ of course means that the next search bit mismatches the search bit presently being employed. Thus, this positive pulse can be used to modify the state of the flip-flop 114. Stated otherwise, it should be apparent that if the flip-flop 114 stores a "1" during time slot $t_1$, and if a "0" is stored in the element of column 1 and row 4 of the matrix, then a positive pulse will appear on word line $104_4$ which pulse indicates that the state of the next search bit is different from the state of the present search bit and therefore that the flip-flop 114 should be switched. In order to do this, the word line $104_4$ is connected to the input of gates 122 and 124 which are respectively connected to the set and reset input terminals of flip-flop 114. The true output terminal 112 of flip-flop 114 is connected to the input of gate 124 and the false output terminal 118 of flip-flop 114 is connetced to the input of gate 122. Thus in response to a positive pulse appearing on the word line $104_4$, the flip-flop 114 will be switched thereby setting the next search bit into it.

Figure 5:
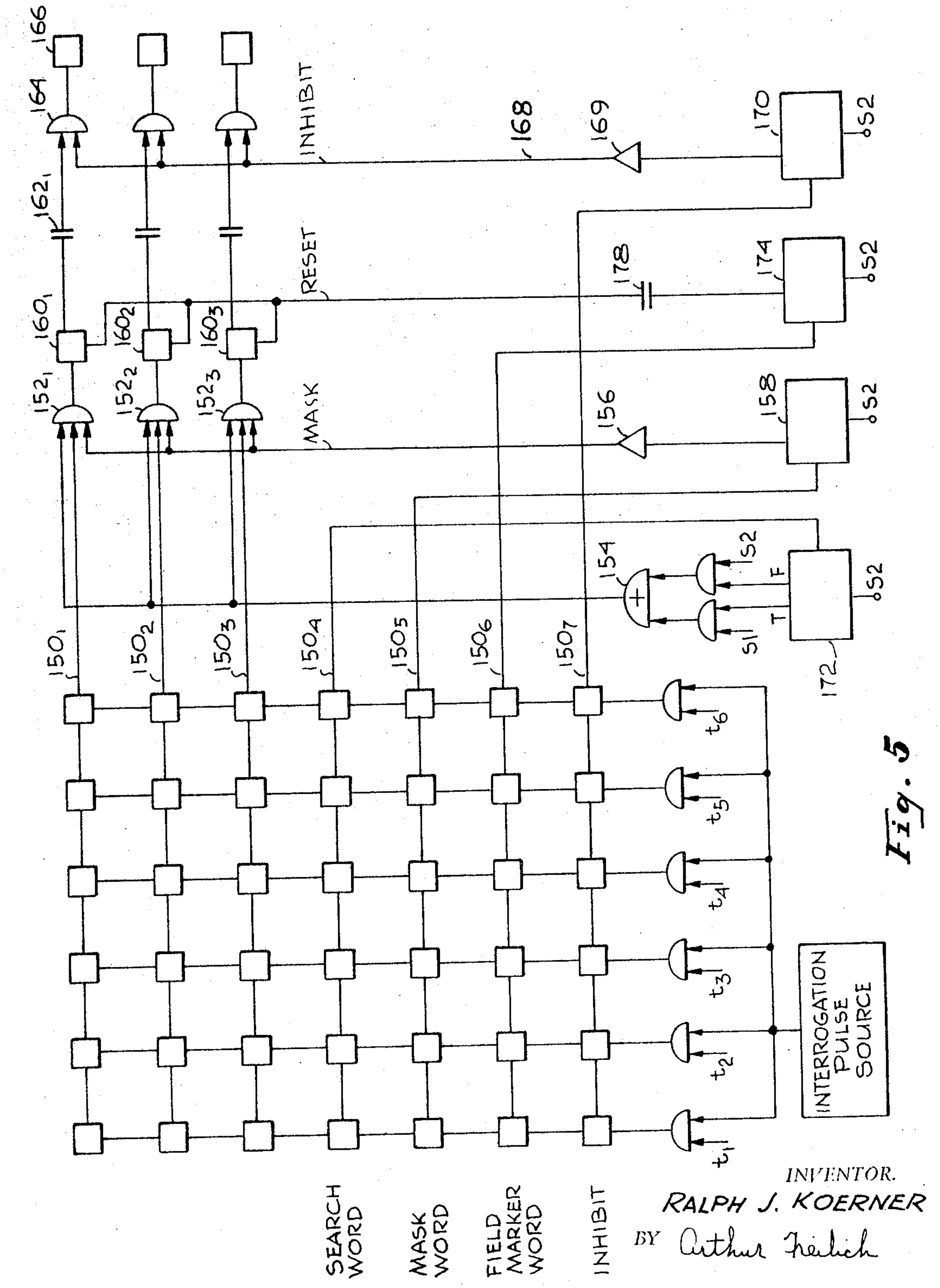
FIGURE 5 is a block diagram of a more complete embodiment of the invention.

Attention is now called to FIGURE 5 which illustrates a more complete embodiment of the invention for the purpose of demonstrating how the concept of sequentially accessing search word bits can be extended for the purpose of accessing control word bits which are used for various purposes, as for example in order to define magnitude criteria. The system shown in FIGURE 5 utilizes the comparison technique shown in the embodiment of FIGURE 1; i.e. the system of FIGURE 5 assumes that complete interrogation pulses are employed on the digit lines. However, it should be apparent that the comparison technique shown in FIGURE 3 wherein interrogation is performed by changing the current level in a digit line in either a first or a second direction, can also be employed.

Let it be assumed that rows 1–3 of the matrix shown in FIGURE 5 respectively store different multibit data words. Prior to considering the search and control words stored in rows 4–7 of the matrix, the elements connected to the output side of the data word word lines $150_1$–$150_3$ will be discussed.

More particularly, each of the data word word lines 150 is connected to the inputs of an AND gate 152. A second input to each of the AND gates 152 is derived from the output of an OR gate 154 which is identical to the OR gate 26 of FIGURE 1. A third input to each of the gates 152 is derived through an inverter 156 from the true output terminal of a mask flip-flop 158. As will be better appreciated hereinafter, when the flip-flop 158 defines a "1" or true state, any mismatch signals appearing on the word lines 150 will be prevented from being coupled to the sense elements 160. Each of the sense elements 160 is a binary device capable of defining a match and a mismatch state. The output of each of the sense elements 160 is connected through a coupling circuit, for example a capacitor 162, to the input of a gate 164. The output of the gate 164 is connected to the input of a match binary element 166 also capable of defining a match and a mismatch state.

If a sense element 160 is in a match state when a mismatch signal is applied thereto, it will switch to a mismatch state and its transition will be coupled through a capacitor 162 connected thereto to a match element 166 if the gate 164 therebetween is enabled. If the sense element transition is coupled to the match element 166, the match element 166 will switch to a mismatch state.

As is discussed in the aforecited U.S. Patent No. 3,297,995, it is sometimes desirable to inhibit coupling between the sense element 160 and match element 166. More particularly, assume an "equal to or greater than" criterion is defined. If a mismatch signal is generated on one of the word lines 150 when the search bit is a zero, it of course means that the compared data word bit is a "1." If the bits are being compared in order of decreasing significance, and if this mismatch signal is the first to be developed on the particular word line, then it indicates that the stored data word is in fact greater than the search word. As a consequence, the data word does match the search word in accordance with the stated criterion and therefore it is necessary to inhibit the mismatch signal which switches the sense element 160 to a mismatch state from being coupled through to also switch the match element 166 to a mismatch state. In order to inhibit this coupling, an inhibit conductor 168, derived from an inverter 169 connected to the true output terminal of an inhibit flip-flop 170, is connected to the input of all of the gates 164. In a circumstance where a magnitude criterion such as "equal to or greater than" is to be utilized, it is necessary that the initial mismatch signal developed on each word line be utilized to switch the sense element 160 connected to that word line inasmuch it is only the most significant digit of the stored data word which is different than the corresponding digit of the search word which determines whether the data word is greater or less than the search word.

It is sometimes desired to define a different criterion for different fields of words. Thus, it may be desired to define one criterion for a field including the first three columns and a second criterion for a second field including the next three columns. In this case, it is necessary of course to reset the sense elements 160 to a match state after compraison of the first field is completed and prior to the comparison of the subsequent field. The sense elements 160 must be reset to a match state inasmuch as they could have been switched to a mismatch state by a mismatch signal occurring during a comparison of the first field which mismatch signal was not coupled through to the match element 166. In order to permit a mismatch signal to be developed during a comparison of the second field which can be coupled through to the match elements 166, it is necessary that the sense elements 160 be reset to a match state in order to respond to any newly generated mismatch signals.

The elements of matrix row 4 are assumed to store the bits of the search word which, it will be recalled, are shifted one column to the left relative to the data words. The elements of row 5 of the matrix are used to store a mask word which also are shifted one column to the left relative to the data words. The elements of matrix row 6 can be employed to store a field marker word. The bits thereof designate the termination of a field and initiate an operation which resets the sense elements 160. The elements of row 7 of the matrix store the bits of an inhibit word which are used to inhibit gates 164.

In the operation of the embodiment of FIGURE 5, it should be appreciated that the search word bits are read out of the elements of matrix row 4 and utilized in the same manner as was discussed with respect to the embodiment of FIGURE 1. That is, during each time slot, the search word bit to be utilized during the next time slot appears on word line $150_4$ and concurrent with strobe pulse S2, sets up the flip-flop 172. Accordingly, if the flip-flop 172 is set to a "1" state, then during the succeeding time slot, the gates 152 will be strobed conicident with strobe pulse S1. On the other hand, if the flip-flop 172 is switched to a "0" state, then the gates 152 during the succeeding time slot will be strobed conicident with strobe pulse S2.

The bits of the mask word are read out on word line $150_5$ and control the state of mask flip-flop 158. Thus, if a positive pulse appears on the word line $150_5$ coincident with strobe pulse S2, flip-flop 158 is set to a true state to thereby inhibit gates 152 (as a consequence of inverter 156) during the next time slot.

In order to reset the sense elements 160 to define a new field, the bits read out of the elements of matrix row 6 and appearing on word line $150_6$, are coupled to the input of a field marker flip-flop 174. The true output terminal 176 of flip-flop 174 is coupled through a capacitor 178 to the reset input terminals of the sense elements 160. Thus, if a positive pulse appears on the word line $150_6$ coincident with a strobe pulse S2, the flip-flop 174 will be switched to a true state. The transition occurring on terminal 176 will be coupled through capacitor 178 to reset the sense elements 160. The delay through the flip-flop 174 should be sufficient to assure that any mismatch signal developed on word lines $150_1$–$150_3$ in response to the same strobe pulse S2, will be passed through the sense elements 160 prior to the elements being reset.

The bits of the inhibit words stored in the elements of matrix row 7 appear on word line $150_7$. Thus, if a positive pulse appears on word line $150_7$ coincident with the strobe pulse S2, the flip-flop 170 is set to a true state thereby inhibiting the gates 164 through the inverter 169 during the next time slot.

As an example of the utility of the embodiment of FIGURE 5, consider that it is desired to define an "equal to or greater than" criterion. As a consequence, it is necessary to inhibit the coupling of mismatch signals from the sense elements 160 to the match elements 166 when the active search bit stored in flip-flop 172 is a "0." In order to insure that coupling through the gate 164 will be inhibited, the flip-flop 170 will of course have to be in a true state. In order for this to occur, it was necessary to read a "1" on the word line $150_7$ coincident with the reading of the "0" search bit on the word line $150_4$. Therefore, it should be apparent that in order to establish an "equal to or greater than" criterion, it is necessary that the inhibit word stored in row 7 contain a "1" wherever the search word contains a "0."

From the foregoing, it should be appreciated that various content addressable memory embodiments have been disclosed herein which employ the concept of sequentially accessing the bits of search words and control words from memory as those bits are needed. More particularly, the search and control word bits are stored in a content addressable memory matrix and are read from the matrix by essentially the same sequencing hardware employed to compare the search word bits with the stored data word bits. It is of course recognized that many variations of the disclosed embodiments will occur to those skilled in the art. For example, other techniques for comparing search word bits and stored data word bits are known which can also be employed with the present concept of accessing the search word and control word bits from memory as they are needed. In addition, it should be realized that no attempt has been made herein to discuss all the control functions which can be performed by control bits sequentially read from the memory and many additional control functions will no doubt occur to those skilled in the art.

The embodiments of the invention in which an exclusive property or privilege is claimed are defined as follows:

1. A content addressable memory system comprising:
a matrix of bit storage elements arranged in rows and columns;
means for applying interrogation signals to said columns of bit storage elements in sequence;
means for successively defining active search bits;
means responsive to the application of said interrogation signals to said columns and to the successive defination of said active search bits for developing successive signal sets, each signal set being comprised of a plurality of signals, each derived from a different one of said rows; and
means responsive to one of said signals in each of said signal sets for controlling said means for defining said active search bits.

2. The memory system of claim 1 including a plurality of digit lines each coupled to all of the elements of a different one of said columns and a plurality of word lines each coupled to all of the elements of a different one of said rows; and wherein
said means for applying interrogation signals to said columns includes means for changing the current level in said digit lines in a first direction in response to a first state of said active search bit and in a second direction in response to a second state of said active search bit.

3. The memory system of claim 2 including a plurality of sensing means each coupled to a different one of said word lines;
each of said sensing means being responsive to a pulse of only a first polarity appearing on the word line coupled thereto.

4. The memory system of claim 2 including a plurality of sensing means each coupled to a different one of said word lines; and
control means responsive to one of said signals in each of said signal sets for controling said plurality of sensing means.

5. The memory system of claim 4 wherein each of said plurality of sensing means includes a sense binary element capable of switching from a match to mismatch state in response to a signal on the word line coupled thereto; and wherein
said control means includes means for controlling the state of said sense binary elements.

6. The memory system of claim 5 wherein each of said plurality of sensing means includes a match binary element;
inhibitive means coupling said sense and match binary elements; and wherein
said control means includes means for controlling said inhibitable means.

7. The memory system of claim 2 wherein each of said elements is responsive to a change in current level on the digit line coupled thereto in a first direction for providing a first polarity pulse on the word line coupled thereto when the element defines a first state and a second polarity pulse when the element defines a second state and wherein each element is also responsive to a change in current level on the digit line coupled thereto in a second direction for providing a second polarity pulse on the word line coupled thereto when the element defines a first state and a first polarity pulse when the element defines a second state.

8. The memory system of claim 7 including a plurality of sensing means each coupled to a different one of said word lines;
each of said sensing means being responsive to a pulse of only a first polarity appearing on the word line coupled thereto.

9. The memory system of claim 7 wherein a multibit search word is stored in the elements of one of said rows; and
means responsive to a first polarity pulse provided on the word line coupled to the elements storing said search word for changing the state of said defined active search bit.

10. The memory system of claim 1 including a plurality of digit lines each coupled to all of the elements of a different one of said columns and a plurality of word lines each coupled to all of the elements of a different one of said rows; and wherein
each of said elements in response to the application of an interrogation signal to the digit line coupled thereto provides on the word line coupled thereto an initial first polarity pulse and a subsequent second polarity pulse when the element defines a first state and an initial seocnd polarity pulse and a subsequent first polarity pulse when the element defines a second state;
a plurality of gating means each coupled to a different one of said word lines; and
means for enabling said gating means coincident with the provision of said initial pulses in response to a first state of said active search bit and coincident with the provision of said subsequent pulses in response to a second state of said active search bit.

11. The memory system of claim 10 including a plurality of sensing means each coupled to a different one of said word lines;

each of said sensing means being responsive to a pulse of only a first polarity appearing on the word line coupled thereto.

12. The memory system of claim 10 including a plurality of sensing means each coupled to a different one of said word lines; and control means responsive to one of said signals in each of said signal sets for controlling said plurality of sensing means.

13. The memory system of claim 12 wherein each of said plurality of sensing means includes a sense binary element capable of switching from a match to a mismatch state in response to a signal on the word line coupled thereto; and wherein said control means includes for controlling the state of said sense binary elements.

14. The memory system of claim 13 wherein each of said plurality of sensing means includes a match binary element;

inhibitable means coupling said sense and match binary elements; and wherein said control means includes means for controlling said inhibitable means.

15. A content addressable memory system comprising:

a matrix of bit storage elements arranged in rows and columns;

means for applying interrogation signals to said columns of bit storage elements in sequence;

means for successively defining active search bits;

means responsive to the application of said interrogation signals to said columns and to the successive definition of said active search bits for developing successive signal sets, each signal set being comprised of a plurality of signals, each derived from a different one one of said rows;

a plurality of sensing means each responsive to the signals derived from a different one of said rows; and control means responsive to one of said signals in each of said signal sets for controlling said plurality of sensing means.

References Cited

UNITED STATES PATENTS

| | | | |
|---|---|---|---|
| 3,290,659 | 12/1966 | Fuller et al. | 340—172.5 |
| 3,299,409 | 1/1967 | Herman | 340—172.5 |
| 3,387,377 | 6/1968 | Cole | 340—172.5 |

BERNARD KONICK, Primary Examiner

JOSEPH F. BREIMAYER, Assistant Examiner

U.S. Cl. X.R.

340—172.5